(12) United States Patent
Dirie

(10) Patent No.: US 6,618,810 B1
(45) Date of Patent: Sep. 9, 2003

(54) BIOS BASED METHOD TO DISABLE AND RE-ENABLE COMPUTERS

(75) Inventor: Herzi Dirie, Round Rock, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/320,565

(22) Filed: May 27, 1999

(51) Int. Cl.[7] .......................... G06F 11/30; H04L 9/00; H04L 9/32
(52) U.S. Cl. ...................... 713/201; 713/200; 713/169; 713/172; 713/155
(58) Field of Search ................... 713/200, 201, 713/181, 172, 169, 185; 235/382, 382.5, 487; 705/405; 380/211, 251

(56) References Cited

U.S. PATENT DOCUMENTS

| 4,740,890 | A | | 4/1988 | William | 364/200 |
|---|---|---|---|---|---|
| 4,864,549 | A | | 9/1989 | Hoole | 368/10 |
| 5,014,234 | A | | 5/1991 | Edwards, Jr. | 364/900 |
| 5,022,077 | A | | 6/1991 | Bealkowski et al. | 380/4 |
| 5,187,352 | A | * | 2/1993 | Blair et al. | 235/382 |
| 5,371,681 | A | | 12/1994 | Juds et al. | 364/479 |
| 5,483,658 | A | | 1/1996 | Grube et al. | 395/800 |
| 5,509,070 | A | | 4/1996 | Schull | 380/4 |
| 5,564,038 | A | | 10/1996 | Grantz et al. | 395/491 |
| 5,651,064 | A | | 7/1997 | Newell | 380/4 |
| 5,675,510 | A | | 10/1997 | Coffey et al. | 364/514 |
| 5,734,819 | A | | 3/1998 | Lewis | 395/186 |
| 5,748,084 | A | | 5/1998 | Isikoff | 340/568 |
| 5,771,347 | A | | 6/1998 | Grantz et al. | 395/186 |
| 5,802,592 | A | | 9/1998 | Chess et al. | 711/164 |
| 5,844,986 | A | | 12/1998 | Davis | 380/4 |
| 5,920,850 | A | * | 7/1999 | Hunter et al. | 705/405 |
| 6,189,105 | B1 | * | 2/2001 | Lopes | 713/202 |
| 6,304,969 | B1 | * | 10/2001 | Wasserman et al. | 713/172 |
| 6,457,129 | B2 | * | 9/2002 | O'Mahony | 713/200 |

* cited by examiner

Primary Examiner—Ly V. Hua
(74) Attorney, Agent, or Firm—Baker Botts L.L.P.

(57) ABSTRACT

A system, method, and program product for disabling operation of a computer system upon expiration of an authorized period of time, and to re-enable operation of the computer system when an extension of time is authorized by the provider of the system. Security features including protected memory for a security timer that keeps track of the amount of time the computer system has been utilized, and encrypted messages for authorizing extensions of time are employed. At one or more predetermined times before the security timer expires, an expiration notice is published to remind the user to renew before the computer system is disabled. After the security timer expires and the computer system is disabled, the computer system may be re-enabled by entering an update to the security timer. Providers of computer systems may thereby prohibit use of the computer systems once the authorized amount of time has expired, and thus encourage payment of lease fees or other agreed performance.

25 Claims, 4 Drawing Sheets

BIOS BASED METHOD TO DISABLE AND RE-ENABLE COMPUTERS

BACKGROUND OF THE INVENTION

1. Field of the Invention

This invention relates to computer operating systems, and more particularly, to a method and apparatus for disabling operation of one or more computer system components when a predetermined event occurs and re-enabling operation of the computer system components when a predetermined condition is met.

2. Description of the Related Art

When a computer system is leased either indefinitely or for a specific amount of time, it is desirable to have the capability to disable the system in the event a client defaults on lease payments or breaches other terms in the lease contract. Further, it is desirable to have the capability to restore system operability once the client becomes current on payments or fulfills other contractual obligations.

In the prior art, there are systems and methods available for disabling operation of unlicensed software programs after a trial period or a predetermined number of uses. Other systems and methods are available to disable licensed software programs when a user attempts to transport and operate licensed software on an unlicensed computer system. Still other systems and methods are known for permitting access to a basic set of features in a software program while disabling advanced features unless and until the user agrees to license the advanced capability. Capability for disabling any software from running on a system based on whether an unauthorized change to the hardware has been detected is also available.

None of the known systems or methods provide the capability to completely disable use of the computer system's hardware and software components when the user violates a term of authorized use. Further, the known systems do not provide a mechanism for re-enabling the computer system once the user complies with the terms of a usage agreement.

SUMMARY OF THE INVENTION

In accordance with one embodiment of the present invention, there is provided a method for disabling operation of a computer system that includes a data processor, a read only memory, a security timer, and a basic input/output operating system (BIOS). The method includes storing a first portion of the BIOS in the read only memory that includes program instructions for initializing the system, updating the security timer, determining whether the security timer has expired, and disabling the computer system when the security timer has expired.

In a further embodiment, the computer system includes a clock, and updating the security timer includes reading the clock, determining the amount of time since the clock was last read, and updating the security timer based on the amount of time since the clock was last read.

In a further embodiment, the security timer is updated by decrementing the security timer at a fixed time interval.

In a further embodiment, a notice is published advising the user that the amount of time authorized for using the computer system has expired.

A further embodiment includes determining when to increment the security timer by an authorized extension of time.

In a further embodiment, the computer system is re-enabled by incrementing the security timer when an extension of time is authorized and the computer system is then initialized for operation.

In a further embodiment, determining whether the security timer should be incremented includes utilizing a cryptographic message system to improve the authenticity of an authorization for an extension of time. Another security feature that may be included is the ability to disable the computer system when it is determined that the system clock or security timer has been tampered.

A further embodiment includes publishing a notice when the security timer has a predetermined amount of time remaining.

In another embodiment, the present invention also provides a security system for enabling and disabling operation of a computer system that includes a central processing unit, a memory, and program instructions for initializing and controlling operation of the computer system. The security system includes a security timer for measuring the amount of time the computer system has been utilized, a first set of program instructions for comparing an amount of time authorized for utilizing the computer system to the amount of time the computer system has been utilized, and a second set of program instructions for at least partially halting operation of the computer system when the amount of time the computer system has been utilized exceeds the amount of time authorized for utilizing the computer system.

Another feature of the present invention includes a third set of program instructions for re-enabling operation of the computer system when an authorized extension of time for utilizing the computer system is detected. To protect the security timer from tampering, the security timer may be implemented so that it resides in write protected, and/or a hidden area of memory. The system may also include a data encryption and decryption system for receiving and authenticating updates to the security timer.

Another feature is a set of program instructions for publishing a notice at a predetermined time before the security timer expires.

To further improve security, the present invention may include a set of program instructions for determining whether the security timer reading is valid.

To keep accurate track of the amount of time the system is utilized, another set of program instructions may be included for generating a system interrupt at fixed time intervals and decrementing the time remaining on the security timer by the fixed time interval. An alternate embodiment for tracking the time remaining includes using a system clock and a third set of program instructions to compare the expiration time for authorized use of the computer system on the security timer to the current time of the system clock.

Another feature of the present invention includes at least partially disabling the computer system when the time on the security timer or the system clock is invalid. This is to prevent users from tampering with the timer or clock to gain unauthorized use of the computer system.

The present invention may also be distributed as a computer program product for enabling and disabling operation of a computer system that includes a first set of program instructions for measuring the amount of time the computer system has been utilized, a second set of program instructions for comparing an amount of time authorized for utilizing the computer system to the amount of time the computer system has been utilized, and a third set of program instructions for at least partially halting operation of the computer system when the amount of time the computer system has been utilized exceeds the amount of time authorized for utilizing the computer system.

Additional features may be included by providing program instructions for re-enabling operation of the computer system when an authorized extension of time for utilizing the computer system is detected, encrypting and decrypting updates to the security timer, publishing a notice at a predetermined time before the security timer expires, determining whether the security timer reading is valid, generating a system interrupt at a fixed time interval and decrementing the time remaining on the security timer by the fixed time interval, checking the validity of the time on the security timer; and at least partially disabling the computer system when the time on the security timer is invalid.

The foregoing has outlined rather broadly the objects, features, and technical advantages of the present invention so that the detailed description of the invention that follows may be better understood.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
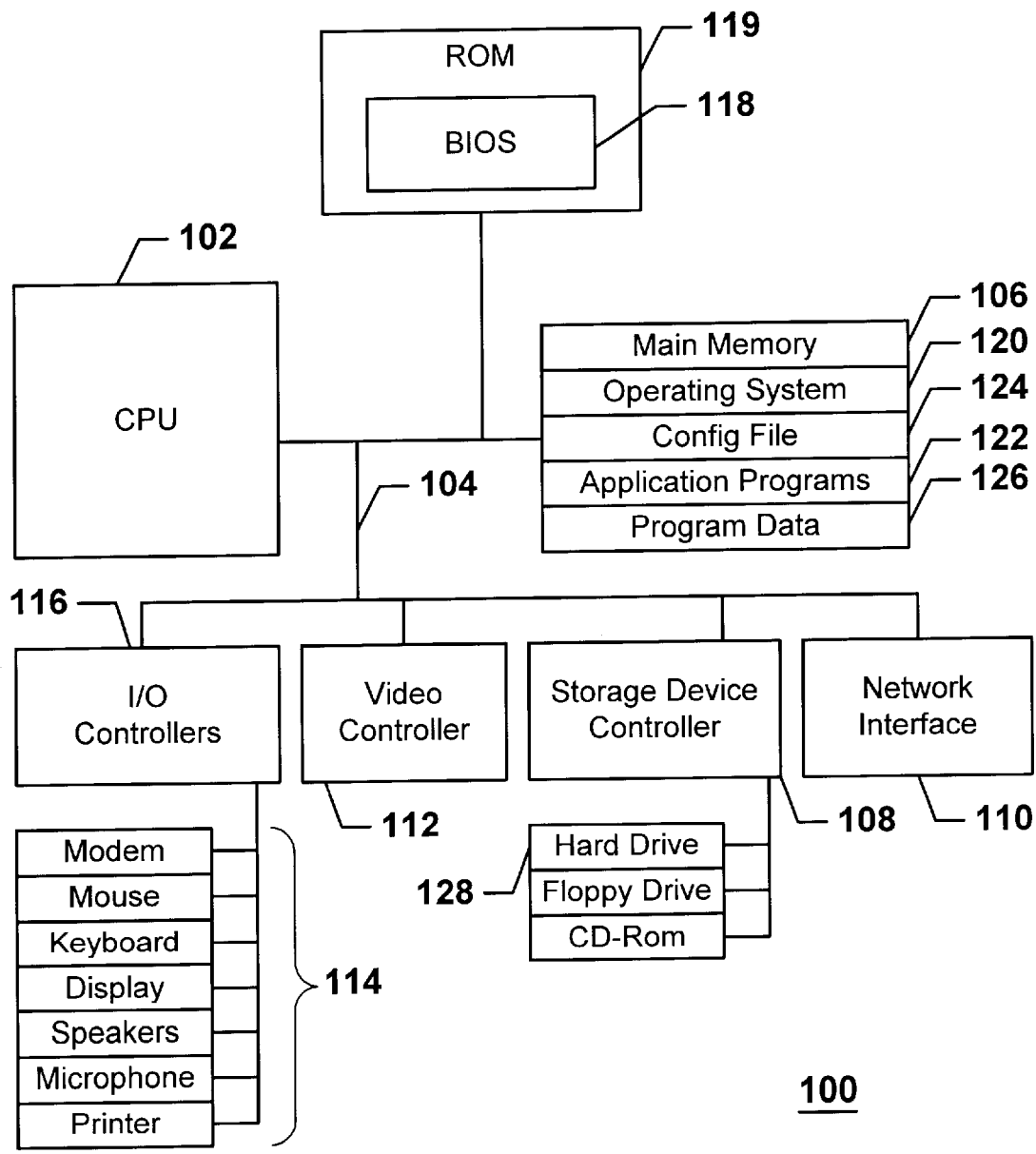
FIG. 1 is a block diagram of a typical computer system with which the present invention may be utilized.

Referring to FIG. 1, computer system 100 includes a central processing unit (CPU) 102 connected by system bus 104 to various components including main memory 106, storage device controller 108, network interface 110, video controller 112, and input/output devices 114 connected via input/output (I/O) controllers 116 Those skilled in the art will appreciate that this system encompasses all types of computer systems: personal computers, midrange computers, mainframes, etc. Note that many additions, modifications, and deletions can be made to this computer system 100 when used as a component of the present invention. Examples of I/O devices that may be connected to system bus 104 for entering and receiving data include a modem, mouse, keyboard, display monitor, speakers, microphone, and printer. Computer system 100 may be one of many workstations connected to a local area network (LAN), a wide area network (WAN), or a global information network such as the Internet.

CPU 102 can be constructed from one or more microprocessors and/or integrated circuits. During operation, main memory 106 is loaded with programs and data that CPU 102 may access. When computer system 100 starts up, CPU 102 passes control to basic input/output system (BIOS) program 118, which is typically located in read only memory (ROM) 119 as part of computer system's 100 firmware. Traditionally, BIOS program 118 is implemented n Erasable Programmable Read Only Memory (EPROM). EPROM has an advantage of not being modified in circuit. To modify the contents of the EPROM, the device must be first erased by being removed from computer system 100 and exposed to ultraviolet light for a prolonged period of time. In this respect, BIOS is not easily upgradeable or replaceable once computer system 100 is assembled and placed in the field, thereby causing unnecessary cost and inconvenience of equipment downtime to customers. Because of the importance of field upgrading, at least a portion of all BIOS firmware is implemented using volatile ROM, known in the art as flash ROM, thereby allowing customers to upgrade and make changes to the BIOS program 118 using not only traditional off-board PROM programming equipment, but also on-board updates and in-system updates where the flash ROM remains physically attached to the motherboard (not shown) in computer system 100 during the update. On-board updates involve an external connection that supplies all signals and voltages required for programming/erasing the flash memory, with an external processor (outside of computer system 100) executing the update algorithm. In-system updates may be performed in several ways including running an update utility that is downloaded from a network or that is distributor on a mass storage device such as a hard disk, floppy disk, or CD-ROM that can be operably connected to computer system 100.

BIOS program 118 has knowledge of the addresses and other details of certain hardware components in computer system 100, thus freeing operating system 120 and application programs 122 from having to understand these details about the attached input/output devices. When device details change, only the BIOS program 118 needs to be changed. When BIOS boots up (starts up) computer system 100, it first determines whether certain specified hardware in computer system 100 is in place and operating properly. BIOS then loads some or all of operating system 120 into main memory 106. Operating system 120 is a program that manages the resources of computer system 100, such as CPU 102, main memory 106, storage device controller 108, network interface 110, I/O devices 114, and system bus 104. The operating system 120 reads one or more configuration files 124 to determine the hardware and software resources connected to computer system 100.

During operation, main memory 106 includes operating system 140, configuration file 124, and one or more application programs 122 with related program data 126. Application programs 122 can run with program data as input, and output their results as program data 126 in main memory 106 or to one or more mass storage devices 128 through storage device controller 108. CPU 102 executes many application programs 122, including one or more programs to establish a connection to a computer network through network interface 110. The application program 122 may be embodied in one executable module or it may be a collection of routines that are executed as required.

Storage device controller 108 allows computer system 100 to retrieve and store data from mass storage devices 128 such as magnetic disks (hard disks, diskettes) and optical disks (CD-ROM). The mass storage devices 128 are commonly known as Direct Access Storage Devices (DASD), and act as a permanent store of information. The information from the DASD can be in many forms including application programs and program data. Data retrieved through storage device controller 108 is usually placed in main memory 106 where CPU 102 can process it.

While main memory 106 and storage device controller 108 are typically separate storage devices, computer system 100 may use known virtual addressing mechanisms that allow the programs of computer system 100 to behave as if they only have access to a large, single storage entity, instead of access to multiple, smaller storage entities (e.g., main memory 106 and mass storage devices 128). Therefore, while certain elements are shown to reside in main memory 106, those skilled in the art will recognize that these are not necessarily all completely contained in main memory 106 at the same time.

Network interface 110 allows computer system 100 to send and receive data to and from any network the workstation may be connected to. This network may be a local area network (LAN), a wide area network (WAN), or a global information network such as the Internet. Suitable methods of connecting to the Internet include known analog and/or digital techniques. Many different network protocols can be used to implement a network. The protocols are implemented in specialized software programs that allow computers to communicate across a network. TCP/IP (Transmission Control Protocol/Internet Protocol), used to communicate across the Internet, is an example of a suitable network protocol.

System bus 104 allows data to be transferred among the various components of computer system 100. Although computer system 100 is shown to contain only a single main CPU 102 and a single system bus 104, those skilled in the art will appreciate that the present invention may be practiced using a computer system that has multiple CPUs 102 and/or multiple busses 104. In addition, the interfaces that are used in the preferred embodiment may include separate, fully programmed microprocessors that are used to off-load computationally intensive processing from CPU 102, or may include input/output (I/O) adapters to perform similar functions.

Figure 2:
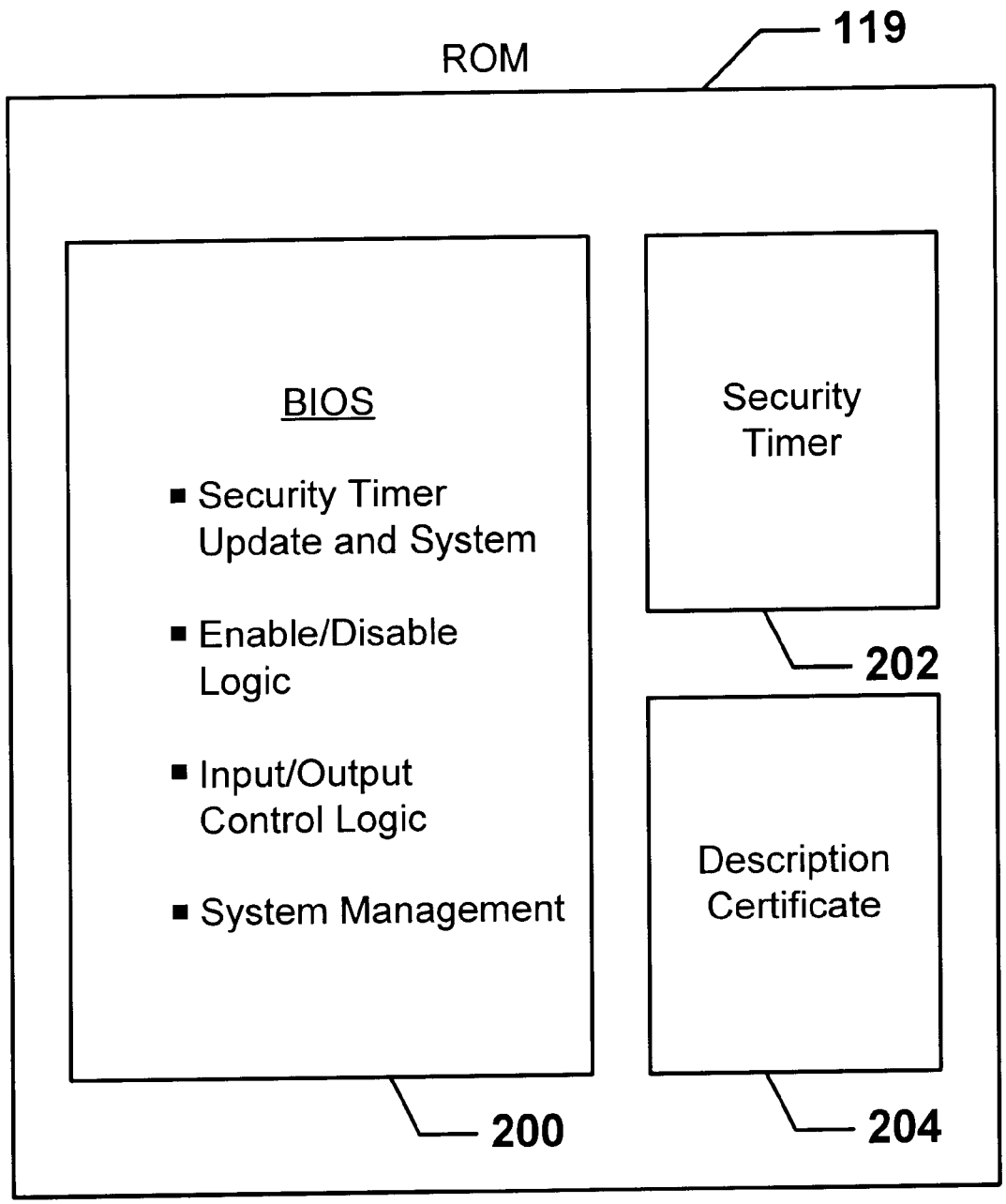
FIG. 2 is a diagram of components in ROM in accordance with an embodiment of the present invention.

In one embodiment of the present invention, BIOS 118 is stored in ROM 119 and includes as part of its program instructions a routine that disables and enables computer system 100 according to whether use of the system is authorized. FIG. 2 shows an embodiment of ROM 119 including BIOS 200, security timer 202, and data encryption certificate 204 as known in the art. In addition to program instructions for managing hardware components and controlling the flow of data input and output in computer system 100, an embodiment of BIOS 200 according to the present invention includes logic and program instructions to increment or decrement security timer 202 depending on whether the system has been used for the amount of time authorized by a lease or other agreement. In another embodiment, security timer 202 and encryption certificate 204 are placed in an area of ROM 119 that is locked and may not be accessed by users. This prevents users from altering the amount of time remaining on security timer 202 and/or the information in encryption certificate 204 that is required to encrypt and decrypt the data between BIOS 200 and security timer 202. Note that the security timer may be implemented to allow the system to be used for a certain number of days, hours of CPU 102 operation, or any other criteria agreed to by the computer system provider and the user. Note also that security timer 202 and encryption certificate 204 are stored in non-volatile ROM so that the information contained in those locations is not lost when power is removed from computer system 100.

Figure 3:
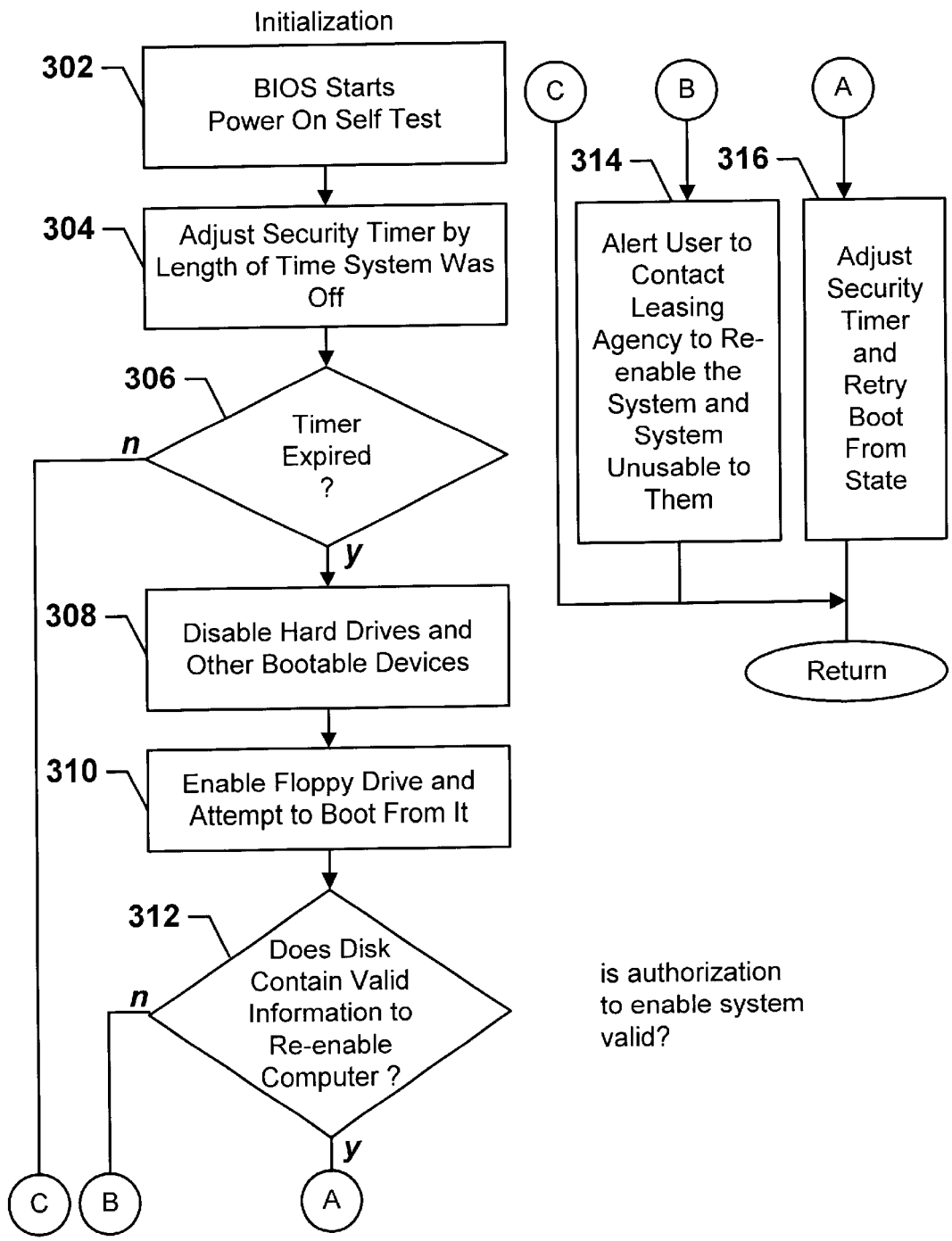
FIG. 3 is a flow diagram of an embodiment of an initialization routine for checking the expiration date of a computer system license on boot-up and re-enabling system on boot-up when license is renewed.

FIG. 3 shows a flow diagram for system enable/disable initialization routine 300 that is executed when computer system 100 is powered on. BIOS 200 starts a power on self-test (POST) in block 302. In an embodiment of the present invention where computer system 100 is leased by calendar days, the POST determines the amount of time that has elapsed between the current time and the time computer system 100 was last powered off and adjusts security timer 202 to reflect the passage of time as shown in bock 304. Note that the operation in block 302 is not required in an embodiment of the present invention where computer system 100 is leased for a number of hours of CPU 102 operation, as security timer 202 may be decremented periodically during operation and the remaining time is retained during power off. Security timer 202 is subsequently checked to see if the amount of time authorized has expired as shown in decision block 306. If security timer 202 has not expired, then control returns to the POST.

If security timer 202 has expired, initialization routine 300 disables operation of computer system 100 unless the user has received authorization to continue. Authorization to re-enable computer system 100 may be granted upon payment of lease fees or other arrangement with the provider of computer system 100 and may be embodied in several different ways. For example, the user may be given a new password to be entered at a prompt provided by initialization routine 300 or a computer-readable medium such as a floppy diskette with a bootable image and/or other encrypted information that is only decipherable by initialization routine 300. Depending on the re-enabling method used, all unnecessary peripheral components from which a bootable image may be accessed such as hard drives and CD-ROMS are disabled as shown in block 308. When authorization to re-enable computer system 100 is provided using a bootable image, the corresponding peripheral device for accessing the information, such as a floppy disk drive, is enabled and BIOS 200 attempts to boot computer system 100 as shown in block 310. Note that if another authorization method is used, the operations performed in block 310 would change correspondingly to take the appropriate action.

Initialization routine 300 then checks whether the authorization to enable computer system 100 is valid. In the embodiment shown in FIG. 3, this is performed in block 312 by determining whether the disk includes information for re-enabling computer system 100. Once again, if another authorization method is used, the operations performed in block 312 would change accordingly to perform the appropriate validity check. If the authorization is not valid, the user may be notified to contact the provider of the system to re-enable operation of computer system 100 in any desired manner, such as shown in block 314 by displaying a message on the computer system's display. If the authorization is valid, block 316 shows that operations are performed to increment the amount of time remaining on security timer 202 and continue booting computer system 100.

Figure 4:
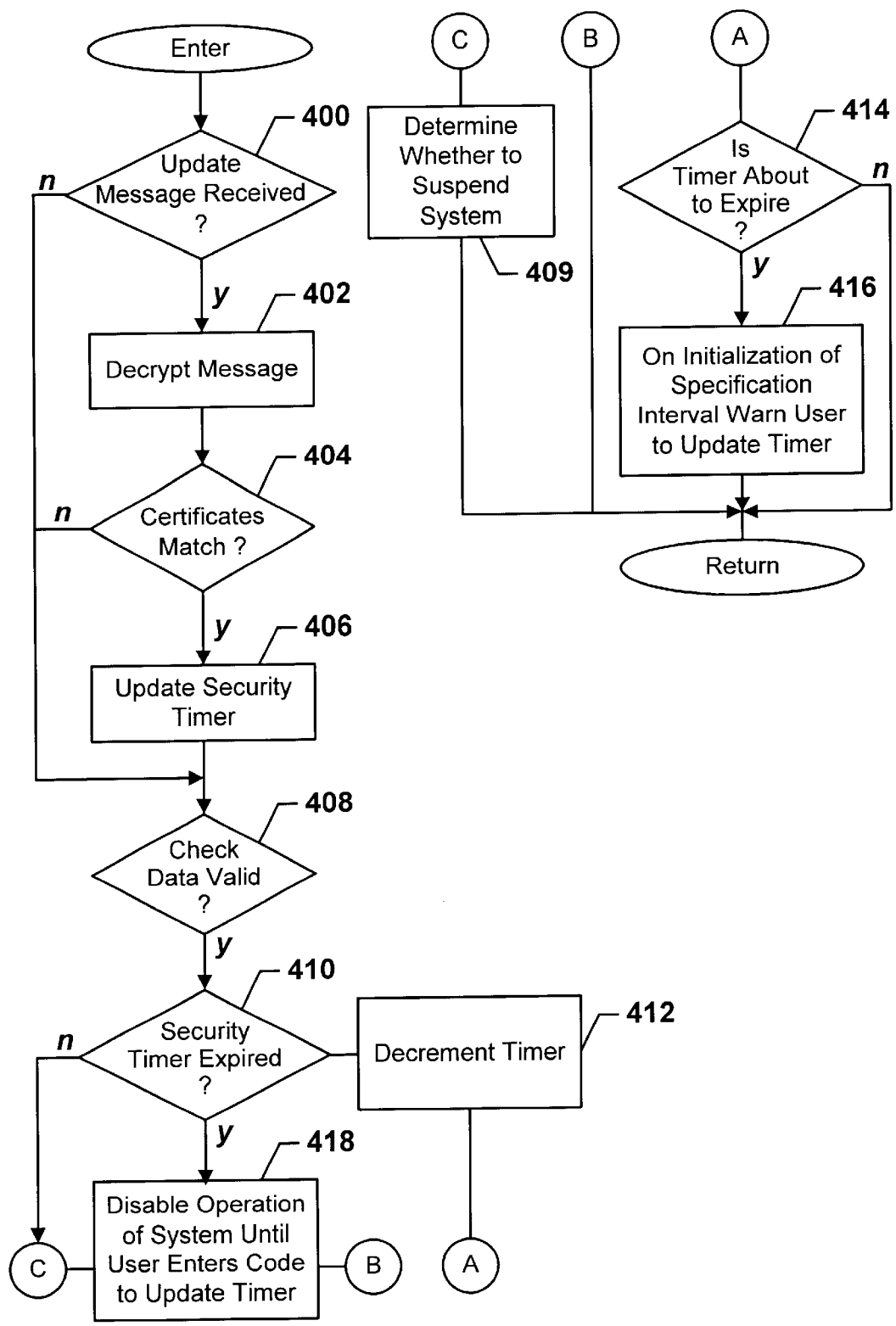
FIG. 4 is a flow diagram for disabling operation of a computer system upon expiration of a license to use the computer system and re-enabling operation of the computer system upon renewal of the license to use the computer system.

Once computer system 100 finishes the boot sequence, BIOS 200 continues controlling input/output and performing system management functions, as well as monitoring security timer 202 for expiration, and updating security timer 202 when an authorized extension of time is presented. FIG. 4 is a flow diagram of an example of logic associated with determining whether computer system 100 should be disabled or re-enabled based on the status of a lease or other limited-time agreement and security timer 202. Decision block 400 checks whether a message to update security timer 202 has been received. In one embodiment, update messages are sent using one of several known encryption/decryption methods such as a public/private key system that uses certificates from a certifying authority to increase the integrity and authenticity of the message, thereby reducing the possibility of an unauthorized extension of time being entered.

In one such a public/private key system, for example, one user, the recipient-to-be, randomly chooses a secret number (private key) and then computes an intermediate number using two publicly-known numbers and the secret number. That user then sends proof of identification along with the intermediate number and the two public numbers, which numbers together form his public key, to a certifying authority that then issues a public key certificate digitally signed by the issuing certifying authority binding the user's identity to the user's public key information. In order to transmit a message to that user, a sending user first obtains the receiving user's certificate and verifies the certifying authority's signature. The sender next computes the session key for that communication session using the recipient's intermediate number from the certificate and the sender's own secret number (chosen at random). The sender then encrypts a message using the session key and places his own intermediate number unencrypted at the head of the communication. Upon receiving the communication the recipient computes the session key using the sender's unencrypted intermediate number and his own secret number, and then uses the session key to decrypt the message.

In embodiments of the present invention utilizing encrypted messages, operations appropriate for the chosen cryptographic system are performed, such as decrypting the message and verifying the information in the certificate in a public key/private key system as shown for example in blocks 402 and 404 in FIG. 4. Upon authenticating the message, security timer 202 is updated accordingly. Note that the update may increment or decrement security timer 202, depending on the circumstances.

If the message cannot be authenticated or if no new message was detected, then control passes to block 408 to check whether clock data is valid. For example, a check to ensure that the time has increased on the clock utilized to determine the passage of time on a lease may be made to prevent a user from trying to extend usage of computer system 100 without authorization by modifying the clock. Note that the clock may be a system timer or a timer on a special purpose chipset as known in the art. Other checks on the validity of clock data may be made as required. If the clock data is invalid, an action predetermined by the provider of computer system 100 may be performed, such as not adjusting security timer 202 or outputting a notice to the user requesting the user to contact the provider before allowing further use of computer system 100.

If the clock data is valid, control passes to block 410 where a check is performed to determine whether security timer 202 has expired. If there is time remaining, security timer 202 is decremented as shown in block 412. In one embodiment, the user may be notified if security timer 202 is close to expiring to help avoid losing use of computer system 100. The threshold time remaining to issue the warning may be determined by the provider of computer system 100, and more than one warning may issued as subsequent time intervals. The notice may be provided as often as desired, such as once when computer system 100 is powered on or upon completion of predetermined time intervals such as incremental percentages of time remaining. In the embodiment shown in blocks 414 and 416, the warning is provided upon boot-up and initialization of computer system 100. One or more methods of providing a visible and/or audible notice of the time remaining to the user may be used including outputting a message on a display or printer, or speakers connected to computer system 100. Notification may also be sent to the provider of computer system 100 when computer system 100 and the provider's computer system is connected to a common network, thereby providing important information to the provider's sales and support personnel.

If security timer 202 has expired, then control is passed to block 414 to disable computer system 100 as shown in block 418. Computer system 100 remains disabled until an authorized update to security timer 202 is made that increments the amount of time computer system 100 may be utilized. In one embodiment, a display may be presented to the user to notify him or her that computer system 100 can no longer be used unless authorization is renewed by the provider, along with any other information the provider wishes to communicate at this time.

The present invention may be implemented on any computer system 100 that includes a clock and a system management program that can execute the program instructions associated with the present invention, including issuing a system interrupt to read the clock and update security timer 202. For example, the present invention may be implemented with a variety of BIOS programs 200 which vary between computer systems 100 to take advantage of the particular hardware and software capabilities of a given computer system 100.

The present invention is described herein in the context of a fully functional computer system, however, those skilled in the art will appreciate that the present invention is capable of being distributed as a program product in a variety of forms, and that the present invention applies equally regardless of the particular type of signal bearing media used to actually carry out the distribution. Examples of signal bearing media include: recordable type media such as floppy disks and CD-ROM, transmission type media such as digital and analog communications links.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. A method for disabling operation of a computer system, the computer system including a data processor, a read only memory, a clock, a security timer operative with the clock, and a BIOS operative with the security timer, the method comprising:

storing a first portion of the BIOS in the read only memory, the first portion of the BIOS including program instructions for initializing the system;

updating the security timer with information from the clock;

determining whether the security timer has expired; and disabling the computer system when the security timer has expired by invoking disabling instructions in the first portion of the BIOS so that the computer is not initialized.

2. The method, as set forth in claim 1, wherein the computer system further includes a clock, and updating the security timer includes:

reading the clock;

determining the amount of time since the clock was last read; and updating the security timer based on the amount of time since the clock was last read.

3. The method, as set forth in claim 2, further comprising determining the validity of the clock reading and disabling the computer system when the clock has been tampered.

4. The method, as set forth in claim 1, wherein updating the security timer includes decrementing the security timer at a fixed time interval.

5. The method, as set forth in claim 1, further comprising:
publishing a notice that the amount of time authorized for using the computer system has expired.

6. The method, as set forth in claim 1, further including:
determining when to increment the security timer by an authorized extension of time.

7. The method, as set forth in claim 1, further comprising:
re-enabling the computer system by incrementing the security timer when an extension of time is authorized; and
initializing the computer system for operation.

8. The method, as set forth in claim 7, wherein re-enabling the computer system by incrementing the security timer when an extension of time is authorized includes utilizing a cryptographic message system for determining the validity of an extension of time.

9. The method, as set forth in claim 1, further comprising publishing a notice when the security timer has a predetermined amount of time remaining.

10. A security system for enabling and disabling initialization of a computer system, the computer system including a central processing unit, a memory, and program instructions for initializing and controlling operation of the computer system, the security system comprising:
a security timer for measuring the amount of time the computer system has been utilized;
a first set of program instructions for comparing an amount of time authorized for utilizing the computer system to the amount of time the computer system has been utilized; and
a second set of program instructions for at least partially halting initialization of the computer system when the amount of time the computer system has been utilized exceeds the amount of time authorized for utilizing the computer system.

11. The security system, as set forth in claim 10, further comprising:
a third set of program instructions for re-enabling operation of the computer system when an authorized extension of time for utilizing the computer system is detected.

12. The security system, as set forth in claim 10, wherein the security timer resides in write protected memory.

13. The security system, as set forth in claim 10, further comprising:
a data encryption and decryption system for receiving and authenticating updates to the security timer.

14. The security system, as set forth in claim 10, further comprising:
a third set of program instructions for publishing a notice at a predetermined time before the security timer expires.

15. The security system, as set forth in claim 10, further comprising:
a third set of program instructions for determining whether the security timer reading is valid.

16. The security system, as set forth in claim 10, further comprising:
a third set of program instructions for generating a system interrupt at fixed time intervals and decrementing the time remaining on the security timer by the fixed time interval.

17. The security system, as set forth in claim 10, further comprising:
a system clock; and
a third set of program instructions for comparing the expiration time for authorized use of the computer system on the security timer to the current time of the system clock.

18. The security system, as set forth in claim 17, further comprising:
a fourth set of program instructions for checking the validity of the time on the security timer and the system clock; and
a fifth set of program instructions for at least partially disabling the computer system when the time on the security timer or the system clock is invalid.

19. A computer program product for enabling and disabling initialization of a computer system comprising:
a first set of program instructions for measuring the amount of time the computer system has been utilized;
a second set of program instructions for comparing an amount of time authorized for utilizing the computer system to the amount of time the computer system has been utilized; and
a third set of program instructions for at least partially halting initialization of the computer system when the amount of time the computer system has been utilized exceeds the amount of time authorized for utilizing the computer system.

20. The computer program product, as set forth in claim 19, further comprising:
a fourth set of program instructions for re-enabling operation of the computer system when an authorized extension of time for utilizing the computer system is detected.

21. The computer program product, as set forth in claim 20, further comprising:
a fifth set of program instructions for encrypting and decrypting updates to the security timer.

22. The computer program product, as set forth in claim 21, further comprising:
a sixth set of program instructions for publishing a notice at a predetermined time before the security timer expires.

23. The computer program product, as set forth in claim 22, further comprising:
a seventh set of program instructions for determining whether the security timer reading is valid.

24. The computer program product, as set forth in claim 23, further comprising:
an eighth set of program instructions for generating a system interrupt at a fixed time interval and decrementing the time remaining on the security timer by the fixed time interval.

25. The computer program product, as set forth in claim 24, further comprising:
a ninth set of program instructions for checking the validity of the time on the security timer; and
a tenth set of program instructions for at least partially disabling the computer system when the time on the security timer is invalid.

* * * * *

UNITED STATES PATENT AND TRADEMARK OFFICE
CERTIFICATE OF CORRECTION

PATENT NO.      : 6,618,810 B1  
DATED           : September 9, 2003  
INVENTOR(S)     : Dirie Herzi It is certified that error appears in the above-identified patent and that said Letters Patent is hereby corrected as shown below:

<u>Title page,</u>
Item [75], should read:
-- [75] Inventor: Dirie Herzi, Round Rock, TX (US) --

Signed and Sealed this

Sixteenth Day of December, 2003

JAMES E. ROGAN
*Director of the United States Patent and Trademark Office*